(12) United States Patent
Aga et al.

(10) Patent No.: US 11,684,046 B2
(45) Date of Patent: Jun. 27, 2023

(54) AQUACULTURE CAGE COMPRISING A MAIN CHAMBER AND A PERIPHERAL RING CHAMBER

(71) Applicant: SEARAS AS, Bergen (NO)

(72) Inventors: Morten Aga, Bergen (NO); Eldar Lien, Bergen (NO)

(73) Assignee: SEARAS AS, Bergen (NO)

( * ) Notice: Subject to any disclaimer, the term of this patent is extended or adjusted under 35 U.S.C. 154(b) by 0 days.

(21) Appl. No.: 16/978,704

(22) PCT Filed: Mar. 6, 2019

(86) PCT No.: PCT/NO2019/050050
§ 371 (c)(1),
(2) Date: Sep. 6, 2020

(87) PCT Pub. No.: WO2019/172776
PCT Pub. Date: Sep. 12, 2019

(65) Prior Publication Data
US 2021/0092941 A1 Apr. 1, 2021

(30) Foreign Application Priority Data
Mar. 6, 2018 (NO) .................................. 20180333

(51) Int. Cl.
*A01K 61/60* (2017.01)
*A01K 63/04* (2006.01)

(52) U.S. Cl.
CPC ............ *A01K 61/60* (2017.01); *A01K 63/042* (2013.01); *A01K 63/047* (2013.01); *A01K 63/045* (2013.01)

(58) Field of Classification Search
CPC ...................................................... A01K 61/60
USPC ....... 119/215, 223, 224, 225, 226, 227, 231, 119/232
See application file for complete search history.

(56) References Cited

U.S. PATENT DOCUMENTS

| 3,996,893 A * | 12/1976 | Buss ...................... A01K 63/00 119/3 |
| 4,211,183 A * | 7/1980 | Hoult ..................... A01K 63/00 119/3 |
| 10,729,110 B2 * | 8/2020 | Nordahl-Pedersen ...................... A01K 61/10 |
| 2004/0256301 A1 * | 12/2004 | Gravdal ................. A01K 63/04 210/169 |

(Continued)

FOREIGN PATENT DOCUMENTS

| CN | 106259137 A | 1/2017 |
| DE | 2829496 A1 | 1/1980 |

(Continued)

OTHER PUBLICATIONS

Patent Cooperation Treaty, International Search Report, Application No. PCT/NO2019/050050, Filing Date: Jun. 3, 2019, Applicant: Searas AS.

(Continued)

*Primary Examiner* — Joshua E Rodden
*Assistant Examiner* — Henry Hooper Mudd
(74) *Attorney, Agent, or Firm* — Flener IP & Business Law; Zareefa B. Flener

(57) ABSTRACT

A tank for farming of marine organisms is described, where the tank includes a main chamber to hold the marine organisms and where the tank has further chambers to treat the water before it is circulated back to the main chamber.

14 Claims, 4 Drawing Sheets

(56) References Cited

U.S. PATENT DOCUMENTS

2010/0170450 A1* 7/2010 Bradley ................ A01K 61/00
　　　　　　　　　　　　　　　　　　　　　　　119/204
2010/0206240 A1　　8/2010　Vento

FOREIGN PATENT DOCUMENTS

| FR | 2573875 A1 | 5/1986 |
|---|---|---|
| GB | 1110020 A | 4/1968 |
| JP | 3022030 U | 3/1996 |
| KR | 101315624 B1 | 10/2013 |
| KR | 101330704 B1 | 11/2013 |
| WO | 9003109 A1 | 4/1990 |
| WO | 2014183765 A1 | 11/2014 |

OTHER PUBLICATIONS

Norweigian Search Report, Patent No. 20180333, dated Jul. 19, 2018.

* cited by examiner

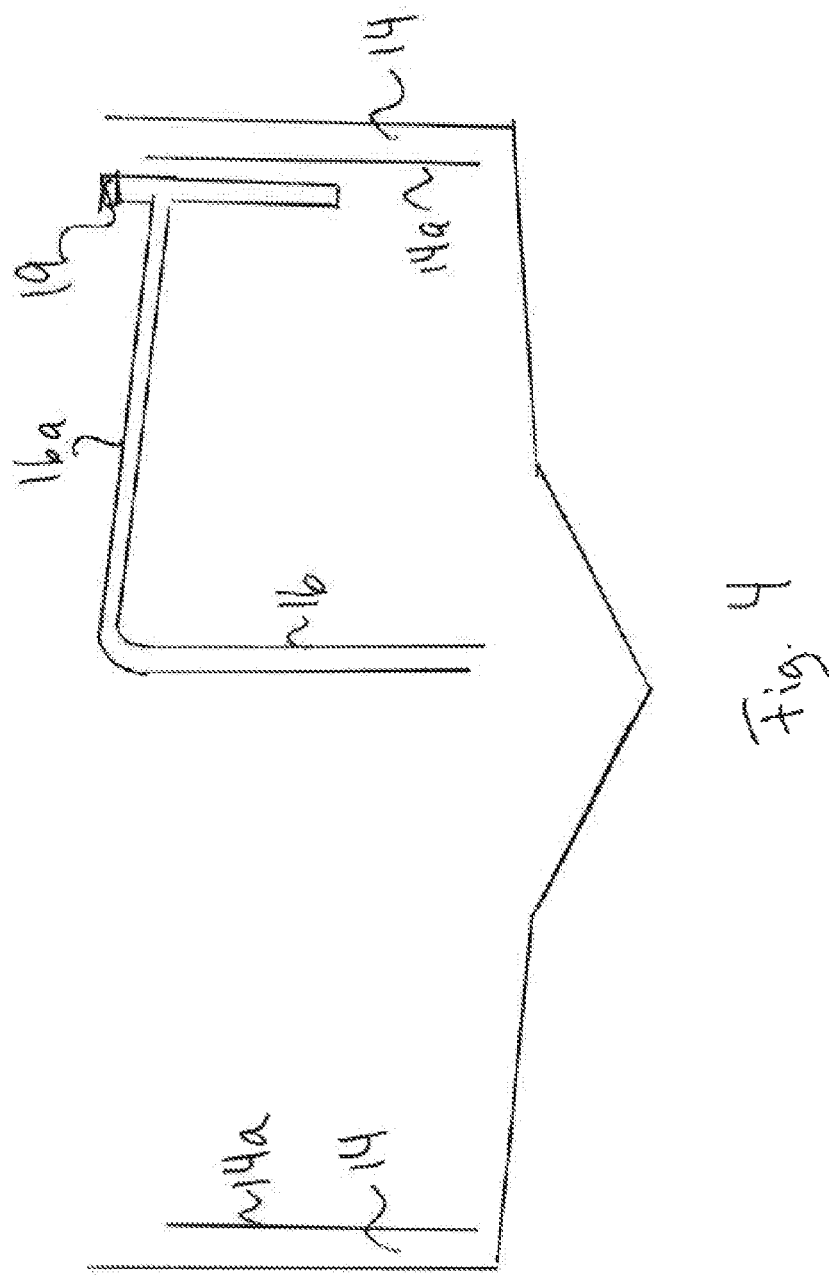

AQUACULTURE CAGE COMPRISING A MAIN CHAMBER AND A PERIPHERAL RING CHAMBER

FIELD OF THE INVENTION

The present invention relates to a farming net cage, in more detail, a net cage for use in RAS installations.

BACKGROUND TO THE INVENTION

There is a great need for fish as a food source and the fish farming industry in Norway is experiencing a great demand. Therefore, new farming installations and net cages for different locations are being developed. Due to problems with diseases, in particular the problem surrounding salmon lice, a number of "closed" solutions have been developed lately. These are installations for use in the sea and on land, but where the net cage walls are closed to prevent ingress of pathogenic organisms.

Also known are so called RAS reactors, i.e. closed Recirculating Aquaculture Systems.

RAS installations are often preferred to open installations at sea because they provide an environment for the fish that can be controlled. However, it is assumed that one manages to clean and control the water in an optimal way and that the solution is economically profitable. An RAS installation is based on standard processes for water treatment that can be illustrated by the following steps:

Disinfected water is taken into the net cage to replace the water which is evaporated and removed by filtration and cleaning. The amount of water suppled to the installation is relatively modest (about 2-3%), as most of the water (about 95-97%) is recirculated in the installation.

The different processes which the water goes through as a part of the cleaning process are:
1. Filtration and protein skimming to remove organic particles. These are often large mechanical filters, often in combination with skimmers (blow air up through the water) in particular, for saltwater systems.
2. Biofilters to remove nitrogen compounds (ammonia). This is carried out in that the water is led through a chamber with a large amount of small plastic cubes of a large surface area. A biofilm is formed on these surfaces that converts the ammonia ($NH_3$, poisonous for the fish) to nitrate. It is ammonia oxidising bacteria that convert the ammonia to nitrite and then nitrite oxidising bacteria convert it further to nitrate. This is nitrification and is a central process in an RAS installation.
3. $CO_2$ removal is carried out in different ways where the principle is aeration and the use of negative pressure.
4. Oxygenation is carried out by special oxygenation installations that force the oxygen into the water.

The four mains steps above are often divided into several sub steps. Traditionally, such an installation is produced in that the water is pumped from one treatment unit to another. Thereby this gives installations which are composed of many treatment units spread out over a large area and with many pipe couplings between them. This is costly and the economics is poor when one considers fish farming on a large scale. Such installations often cover 10,000-20,000 square meters.

WO2014/183765 describes a farming net cage comprised of a central tank and one or more surrounding tanks. The central tank is used for water treatment and the surrounding tanks are used for the farming of fish.

DE2829496 describes a farming installation where the fish are in a main chamber where water is transferred for cleaning to chambers inside the main chamber. After the water has been in all three chambers it is led back in pipes to the main chamber.

OBJECT OF THE PRESENT INVENTION

Therefore, it is an object of the present invention to develop a more compact system where the different treatment processes can be carried out in units that are integrated into the net cage. It is also an object of the invention to provide a system with more optimal water flow and this is particularly important to save energy which is necessary to lift and move the water.

SUMMARY OF THE INVENTION

Thus, the present invention relates to a net cage for farming of marine organisms, where the net cage is comprised of a main chamber to hold the marine organisms, characterised in that the net cage also comprises a first ring chamber arranged at the periphery of the main chamber where water from the main chamber is circulated via pipelines to a ring chamber or to the main chamber.

In one embodiment water is circulated via pipelines to the first ring chamber and where there are openings in the wall of the first ring chamber set up so that the water is circulated back to the main chamber.

In one embodiment the net cage is comprised of a second ring chamber along the periphery of, and external with respect to the main chamber and internally for the first ring chamber where the water is circulated from the main chamber via the first ring chamber and thereafter via the second ring chamber and back to the main chamber.

In one embodiment the net cage is comprised of one or more pipelines and these are arranged near the centre of the main chamber and are fitted with a pumping device that lifts the water sufficiently high so that the water runs freely in the horizontally inclining section of the pipeline to the first ring chamber.

In one embodiment the pumping device is a propeller pump.

In one embodiment arranged in communication with a pipeline, is a vacuum pump, such as a fan, set up so that a negative pressure is established in the pipeline section.

In one embodiment a negative pressure and venting from the pipeline are established with a cyclone.

In one embodiment water circulates slowly via the pipeline so that the water is exposed to a negative pressure for a long time.

In one embodiment the device encompasses an injector for addition of small gas bubbles, preferably microbubbles and more preferably micro air bubbles, in the fluid that is transported through the pipeline.

In one embodiment in the first ring chamber air supply means for the supply of air, preferably upwards directed air in the first ring chamber, is set up.

In one embodiment microbubbles are supplied with injectors to the first ring chamber.

In one embodiment the net cage also comprises one or more drainage wells arranged peripherally adjoining the upper section of the first ring chamber such that foam is transferred from the first ring chamber to the drainage wells.

In one embodiment said second ring chamber is set up as a bio-filter, preferably in that air is blown into the chamber and gets the water into circulation and that arranged in the water is a number of bodies with a large surface area for nitrification of the water.

In one embodiment the net cage is comprised of a third ring chamber peripheral to the main chamber in its upper section and where this third ring chamber is comprised of means for the supply of oxygen and/or air to the water in the ring chamber.

In one embodiment water is circulated from the third ring chamber to the main chamber via overflow systems arranged in the third ring chamber.

In one embodiment the net cage is comprised of a main chamber with a water level V1, a first ring chamber with a water level V2, a second ring chamber with a water level V3 and a third ring chamber with a water level V4 set up so that the water level V1 is the lowest water level and where the water level V2 in the first ring chamber is the highest water level and where respective water levels V3 and V4 are successively lower than V2 but higher than V1.

In one embodiment the first ring chamber is comprised of several nozzles along the circumference of the chamber set up to supply air to the chamber such that the water is circulated and aerated in the chamber.

In one embodiment the first ring chamber has a vertical extension corresponding to the vertical depth of the wall section of the net cage.

In one embodiment the second ring chamber has a vertical extension corresponding to the vertical depth of the wall section of the net cage.

In one embodiment a pump, preferably a propeller pump, is set up in the pipeline and gets the water in circulation from the main chamber to the first ring chamber.

In one embodiment means are arranged in the second ring chamber to blow air up along the wall in the second ring chamber so that the water is made to circulate vertically in the second ring chamber.

In one embodiment the bottom of the main chamber inclines and has a well in the centre for the collection of dead marine organisms and waste.

In one embodiment the outer wall of the main chamber is insulated.

In one embodiment a roof is arranged over the net cage and said roof is dimensioned for lifting and anchoring of the walls between the ring chambers and between the ring chambers and the main chamber.

In one embodiment the first ring chamber is divided into several part chambers, either by horizontal or vertical wall sections.

In one embodiment such different water treatment methods are carried out in the different part chambers.

DESCRIPTION OF THE FIGURES

Preferred embodiments of the invention shall be described in the following in more detail with reference to the enclosed figures, where:

FIG. 4 shows schematically a solution where water is circulated from a position centrally in the main chamber to a position at the outer edge of the main chamber.

FIG. 1 shows schematically an embodiment of a farming net cage 10 according to the invention. The net cage 10 is fitted with a number of walls 10a and a bottom 10b that form a main chamber 12 for farming of marine organisms such as fish. These wall and bottom sections can have any suitable form, but the walls 10a are often approximately vertical and the bottom section 10b is often horizontal. The bottom section can also be tapered so that it is somewhat deeper towards the centre of the net cage, or it can have a section that tilts towards the centre of the net cage.

Figure 1:
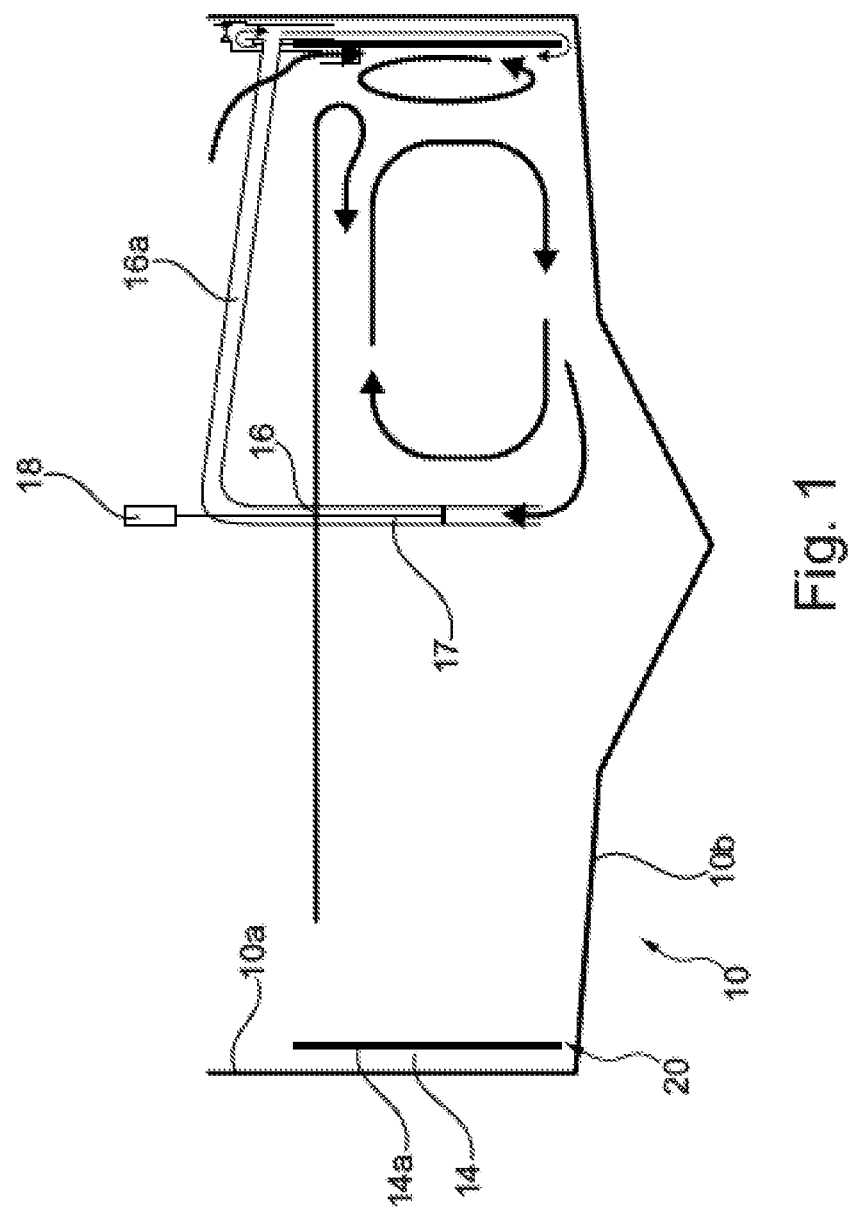
FIG. 1 shows schematically a farming net cage with a first ring chamber arranged externally to the main chamber.

The farming net cage 10 that is shown in FIG. 1 is closed, i.e. the wall and bottom sections are impenetrable to water. The net cage 10 can be arranged to float in the water or the sea and is then equipped with a float collar (not shown in the figure) to ensure sufficient buoyancy of the net cage. However, preferred embodiments of the net cage are used on land and are then arranged in a frame or that the net cage 10 is sufficiently rigid so that it can be placed on land.

As large amounts of water must be treated continuously and since the water must be subjected to several different water treatment processes, units with considerable water chambers are required to carry out the different processes. With today's solutions water is transported out of the net cage or the chamber and the different water treatment steps are often carried out in separate modules or processes.

With the present invention a solution is provided where different water chambers are placed in the outer circumference of the chamber/net cage. As it is often preferred to use circular net cages or chambers, these water treatment chambers are set up as annular spaces in the outer periphery of the net cage. The annular spaces are given an extension and volume adapted to the amount of water that shall be treated and shall be circulated back to the main chamber of the net cage.

FIG. 1 shows a net cage 10 with a first ring chamber 14. It is preferred that the ring chamber 14 uses the whole or most of the vertical extension of the net cage 10. The net cage 10 can be fitted with several such ring chambers and we therefore designate the outermost ring chamber 14 (the only ring chamber in FIG. 1) as the first ring chamber 14. The first ring chamber 14 can, in principle, be set up with a dividing wall which is set into a net cage or a vessel or it can be one unit which is set up at the outside of the net cage.

FIG. 1 also shows pipelines 16 to circulate water from the main chamber 12 to the first ring chamber 14. Of course, there can be several such pipelines 16 to circulate water to the first ring chamber 14. The pipelines 16 have a vertical section that extend from above the water level V1 in the main chamber 12 and down into the water in the main chamber 12 and in the main horizontally but a part 16a tilts and freely leads the water that is lifted up from the main chamber 12 out towards the first ring chamber 14. The water inlet for the pipeline 16 is arranged near the centre of the net cage 10 to ensure that the water, after it has been lifted mainly vertically up, is transported a long distance before it is sent into the first ring chamber 14. For a net cage with a diameter of 50 metres, the water can be transported much further than 20 metres with this solution before it is poured into the ring chamber 14.

In an alternative embodiment water is circulated from the main chamber 12 to a different location in the main chamber 12. It is preferred that water is moved in this way from centrally in the main chamber 12 to a point nearer the outer part of the main chamber 12. This point is preferably near, and external with respect to the ring chamber 14 as given in FIG. 4.

A pumping device 18 to pump up the water from the main chamber 12 is arranged in the pipeline 16. It is preferred that this is a propeller pump 18 which is well suited to pumping of large amounts of water at a low pressure.

With the help of an injector 17 placed in the pipeline 16, which adds small air bubbles in the water, $CO_2$ will go from the water and into the air bubbles. Here, there is a relatively high level of $CO_2$ and low level of 02. There is then a mixture of water and small air bubbles in the pipeline section 16a and $CO_2$ goes from the water and into the air bubbles due to the equilibrium principle.

To generate a negative pressure in the pipeline section 16a, and also to get rid of the air bubbles which have, at this stage, a high level of $CO_2$, a fan 19 (shown in FIG. 3) will be installed which generates a negative pressure and which pulls the air bubbles out from the water. Because of the negative pressure and a large surface between the air bubbles and water this method will efficiently remove $CO_2$ from the water.

This will remove unwanted $CO_2$ from the water during the passage from the main chamber 12 to the first ring chamber 14. It is preferred that the water moves so slowly that the water is exposed to a negative pressure over a long time and thus a good removal of $CO_2$ will be obtained.

This is the core of the present invention, i.e. that large isolated bodies of water can be established (as the first ring chamber 14) as an integrated part of the net cage 10, and where the water which is lifted up from the main chamber 12 is horizontally moved slowly under a negative pressure to further water treatment processes that can be carried out in ring chamber 14.

As given in FIG. 1, openings 20 are arranged in the first ring chamber 14 so that the water is circulated back to the main chamber 12. In the figure, these are shown at the bottom in the wall between the main chamber 12 and the first ring chamber 14, but they can also be placed higher up on the wall. To obtain the required circulation, the openings 20 are preferably arranged in the bottom section of the first ring chamber 14. Furthermore, one has arranged in the first ring chamber 14 means (not shown in the figures) for the supply of gases or air, in addition to what has been supplied to the pipeline 16, as given above. These ensure that air is supplied to the first ring chamber 14 and preferably flows upwards in the first ring chamber 14, i.e. counter current to the direction of the water. The air supply means that the water in the ring chamber 14 is set in a circular motion and foam can be removed (explained in more detail below).

As given above a series of water treatment processes must be carried out before the water can be recirculated back to the main chamber 12. Therefore, it is often preferred to have more than one ring chamber arranged peripherally outside of the main chamber 12.

Figure 2:
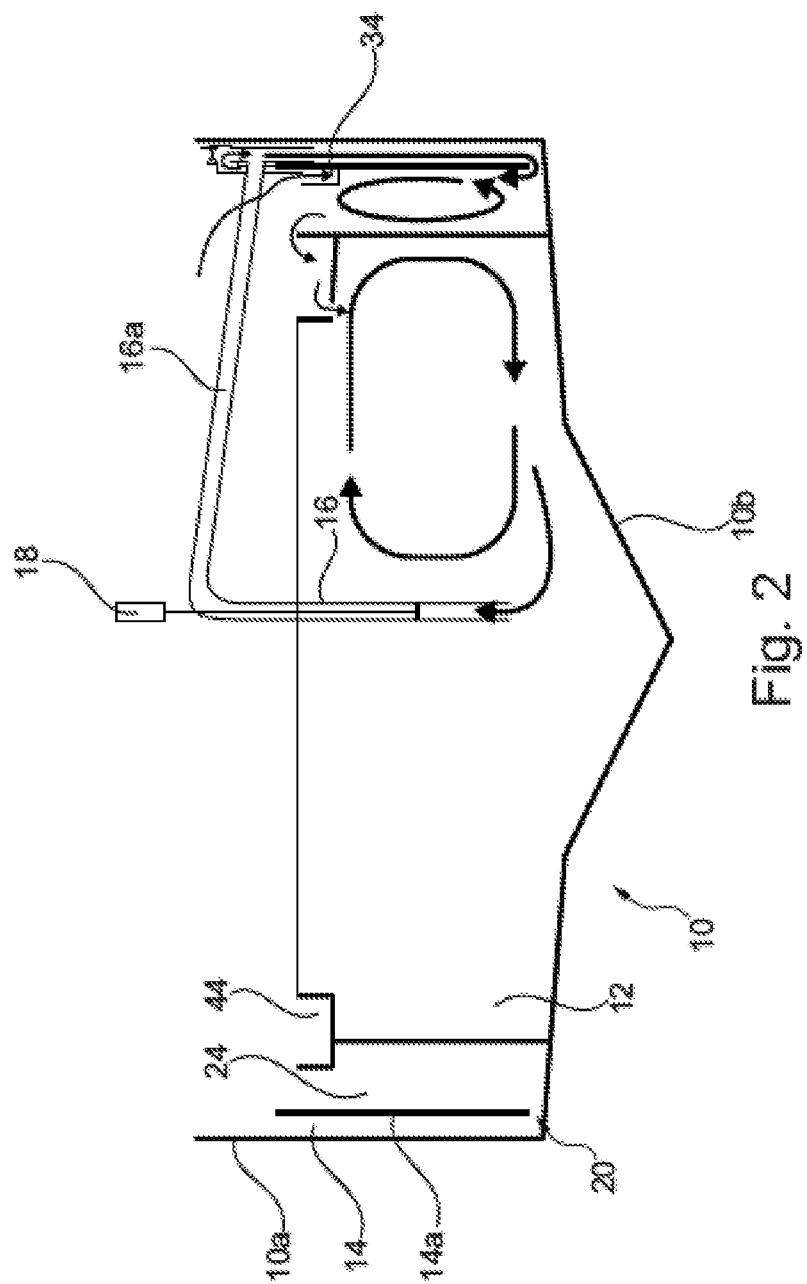
FIG. 2 shows schematically a farming net cage where several ring chambers are arranged for treatment of water.

FIG. 2 shows embodiments where several ring chambers are arranged so that different water treatment methods can be carried out in the different ring chambers. However, in one embodiment of the invention the first ring chamber 14 is split into several part chambers so that the water circulates from one part chamber and over into the next part chamber. For example, ring chamber 14 can be divided by vertical walls so that the water circulates circularly from one part chamber and over into the next part chamber. One can also imagine solutions where the part chambers are below each other, separated by horizontal wall sections. Either one has a horizontal division or a vertical division of the ring chamber 14 into several part chambers, one can, for example, carry out skimming in a first part chamber, biofiltration in a second part chamber and oxygenation in a third part chamber, before the water is led back to the main chamber 12.

In FIG. 2 a presently preferred embodiment of the invention is shown. A net cage 10 is fitted with several ring chambers 14,24. Arranged inside the first ring chamber 14 is a second ring chamber 24 and water is led from the first ring chamber 14 via this second ring chamber 24 to the main chamber 12, preferably via overflow. Thereby, one gets a possibility to place further water treatment steps in the solution and in the embodiment shown in FIG. 2 a first ring chamber 12 is used for aeration and skimming (as explained above) and the second ring chamber 24 is used for biofiltration.

For biofiltration, small plastic particles with a large surface area are normally used whereupon a biofilm with bacteria that convert ammonia to nitrate (conventional nitrification) is formed.

In FIG. 2 a drainage well 34 is also shown bordering on to the upper section of the first ring chamber 14, for transfer of foam (skimming) i.e. removal of foam and polluting particles from the water.

FIG. 2 also shows a third ring chamber 44 which is used for oxygenating the water. $CO_2$ that is produced by the biofilter in the second ring chamber 14 is also removed here before the water enters the main chamber 12. The third ring chamber is, in the embodiment in FIG. 2, placed such that water flows from the second ring chamber 24 via overflow to the third ring chamber 44. Openings 44a are arranged in a third ring chamber 44, preferably in the bottom section of the ring chamber 44 such that water flows from the third ring chamber to the main chamber 12. Oxygen and/or air is supplied to the water in the third ring chamber 44 at the same time as $CO_2$ is removed with the help of additions of small air bubbles in the water.

The flow of water is indicated with arrows in the figures, i.e. water is led from the main chamber 12 via the pipeline 16 to the first ring chamber 14, and then vertically down and through the openings 20 in the bottom section of the second ring chamber 24. Air is supplied in the second ring chamber 24 to establish a vertical circular movement of the water in the ring chamber 24 before it flows on via overflow to the third ring chamber 44 and thereafter via openings in the bottom section in the third ring chamber 44 to the main chamber 12. In this circular flow movement, water passes through different water treatment processes arranged in different ring chambers 14,24,44 externally to the main chamber 12.

The different ring chambers 14,24,44 can have any possible shape and size. However, to obtain a compact installation 10 it is preferred that one or more of the ring chambers have a vertical extension corresponding to the vertical extension of the net cage 10.

Figure 3:
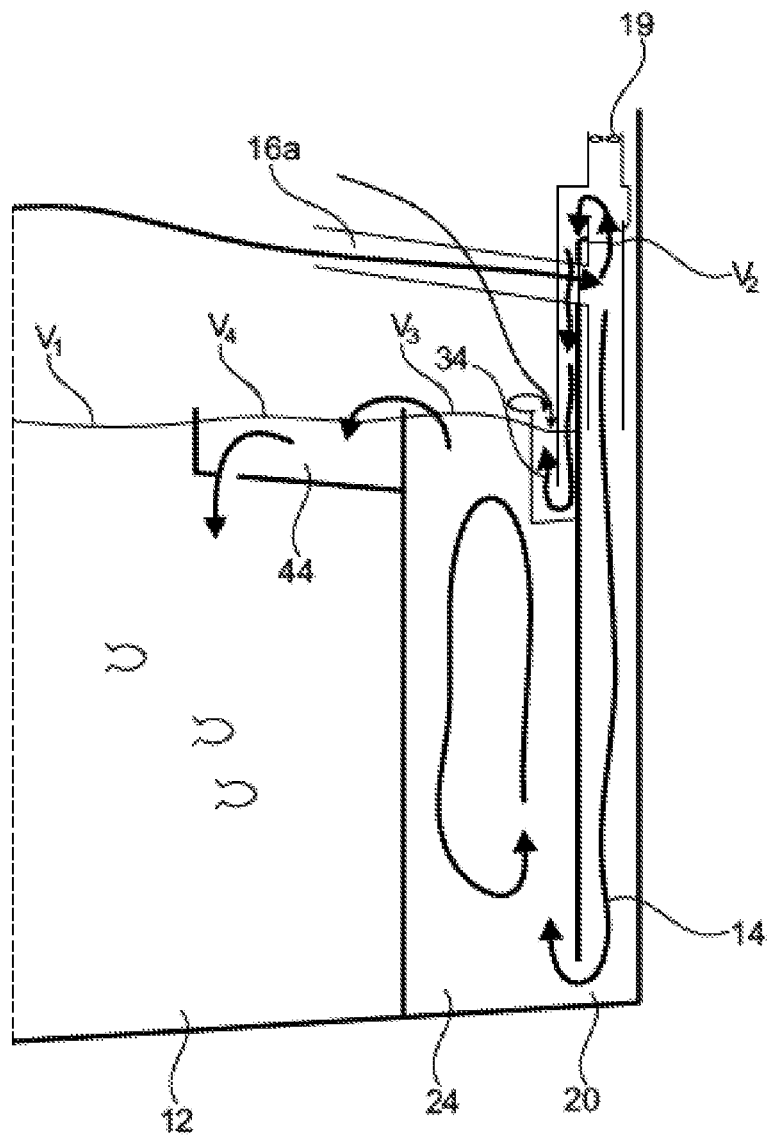
FIG. 3 shows schematically in more detail different water chambers, as well as the water levels in the chambers.

FIG. 3 shows schematically in section a detail of the main chamber 12, the first ring chamber 14, second ring chamber 24 and a third ring chamber 44 and also the different water levels that are established. The water level in the main chamber 12 is given as V1 and is the lowest water level. The water level in the first ring chamber 14, given as V2 is the highest water level. In between, the other ring chambers have successively lower water levels so that the second ring chamber 24 has a water level V3 which is lower than V2, but higher than the water level V4 for the third ring chamber 44. Therefore, the water is forced to flow from the first ring chamber 14, via the second ring chamber 24 via the third ring chamber 44 and to the main chamber 12.

In a preferred embodiment the net cage 10 is fitted with a roof. Furthermore, the outer walls of the net cage are preferably insulated, and the roof is also insulated.

The walls between the different ring chambers, and the wall between the main chamber and the ring chamber is preferably made from thin plastic plates or tarpaulin, and structurally fastened to the roof at several points.

If the net cage/vessel is for placing on land, it is preferably manufactured from steel, concrete or plastic and covered internally by plastic.

FIG. 4 shows an embodiment where water is led centrally in the main chamber 12 to a position at the outer edge of the main chamber 12. It is preferred that the water is led to a position adjoining the outside of the ring chamber 14.

The invention claimed is:

1. A tank for farming of marine organisms, the tank comprising:
a main chamber to hold the marine organisms, wherein the tank further comprises:
a first ring chamber arranged at the periphery of the main chamber; and wherein
water from the main chamber is circulated via one or more pipelines to the first ring chamber or to the main chamber, and wherein the one or more pipelines are arranged near the center of the main chamber and fitted with a pumping device that lifts the water sufficiently high up so that the water flows freely in a horizontally tilted section to the first ring chamber.

2. The tank of claim 1, wherein the water is circulated via the one or more pipelines to the first ring chamber and wherein there are openings in a wall of the first ring chamber set up so that the water is circulated back to the main chamber.

3. The tank of claim 1 further comprising a second ring chamber along the periphery of and external to the main chamber and internal to the first ring chamber, wherein the water is circulated from the main chamber via the first ring chamber and thereafter via the second ring chamber and back to the main chamber.

4. The tank of claim 1, wherein the pumping device is a propeller pump.

5. The tank of claim 1, wherein a vacuum pump is disposed in communication with the one or more pipelines and set up so that a negative pressure is established in a section of the one or more pipelines, or so that a negative pressure and venting from the one or more pipelines are established with a cyclone.

6. The tank of claim 5, wherein the water circulates via the one or more pipelines so that the water is subjected to a negative pressure.

7. The tank of claim 1, further comprising an injector for the addition of small gas bubbles into the water that is led through the one or more pipelines.

8. The tank of claim 1, wherein an air supply means is arranged in the first ring chamber for the supply of air, or wherein microbubbles are added via an injector to the first ring chamber, or wherein the tank further comprises one or more drainage wells arranged peripherally adjacent to an upper section of the first ring chamber such that foam is transferred from the first ring chamber to the drainage wells.

9. The tank of claim 3, wherein the second ring chamber is set up so that air is blown into the second ring chamber and sets the water in a circulating motion and wherein a number of bodies with surfaces are arranged in the water for nitrification of the water.

10. The tank of claim 1, further comprising a second ring chamber peripheral to the main chamber in an upper section wherein the second ring chamber comprises means for the supply of oxygen and/or air to the water in the second ring chamber.

11. The tank of claim 10, wherein the water from the third ring chamber is circulated to the main chamber via an overflow arranged in the third ring chamber.

12. The tank of claim 1, wherein the main chamber further comprises water having a water level V1, the first ring chamber further comprises water having a water level V2, and the tank further comprises a second ring chamber comprising water having a water level V3 and a third ring chamber comprising water having a water level V4 set up such that the water level V1 is the lowest water level and where the water level V2 in the first ring chamber is the highest water level and where the respective water levels V3 and V4 are successively lower than V2, but higher than V1.

13. The tank of claim 1, wherein the first ring chamber comprises a plurality of nozzles along the circumference of the first ring chamber set out to supply air to the first ring chamber so that the water is circulated and aerated in the first ring chamber, or wherein
the first ring chamber has a vertical extension corresponding to the vertical depth of a wall section of the tank, or wherein
the tank further comprises a second ring chamber having a vertical extension corresponding to the vertical depth of the wall section of the tank, or wherein
a pump is arranged in the one or more pipelines and sets the water to circulate from the main chamber to the first ring chamber, or wherein
the tank further comprises a second ring chamber having means arranged in the second ring chamber to blow air upwards along a wall in the second ring chamber so that the water is set into rotation vertically in the second ring chamber.

14. The tank of claim 1, wherein the bottom of the main chamber slopes down towards the center of a well where there is a collection of dead marine organisms and waste material, or wherein
an outer wall in the main chamber is insulated, or wherein
the tank further comprises a plurality of ring chambers defined by additional ring chambers in addition to the first ring chamber, a roof is placed over the tank and the roof is dimensioned for lifting and anchoring of walls between the plurality of ring chambers and between the plurality of ring chambers and the main chamber, or wherein
the first ring chamber is divided into a multitude of part chambers, either by horizontal or vertical wall sections.

\* \* \* \* \*